April 8, 1958     C. KOSTKA     2,829,552
TAIL END STOCK VISE
Filed Nov. 13, 1953     2 Sheets-Sheet 1
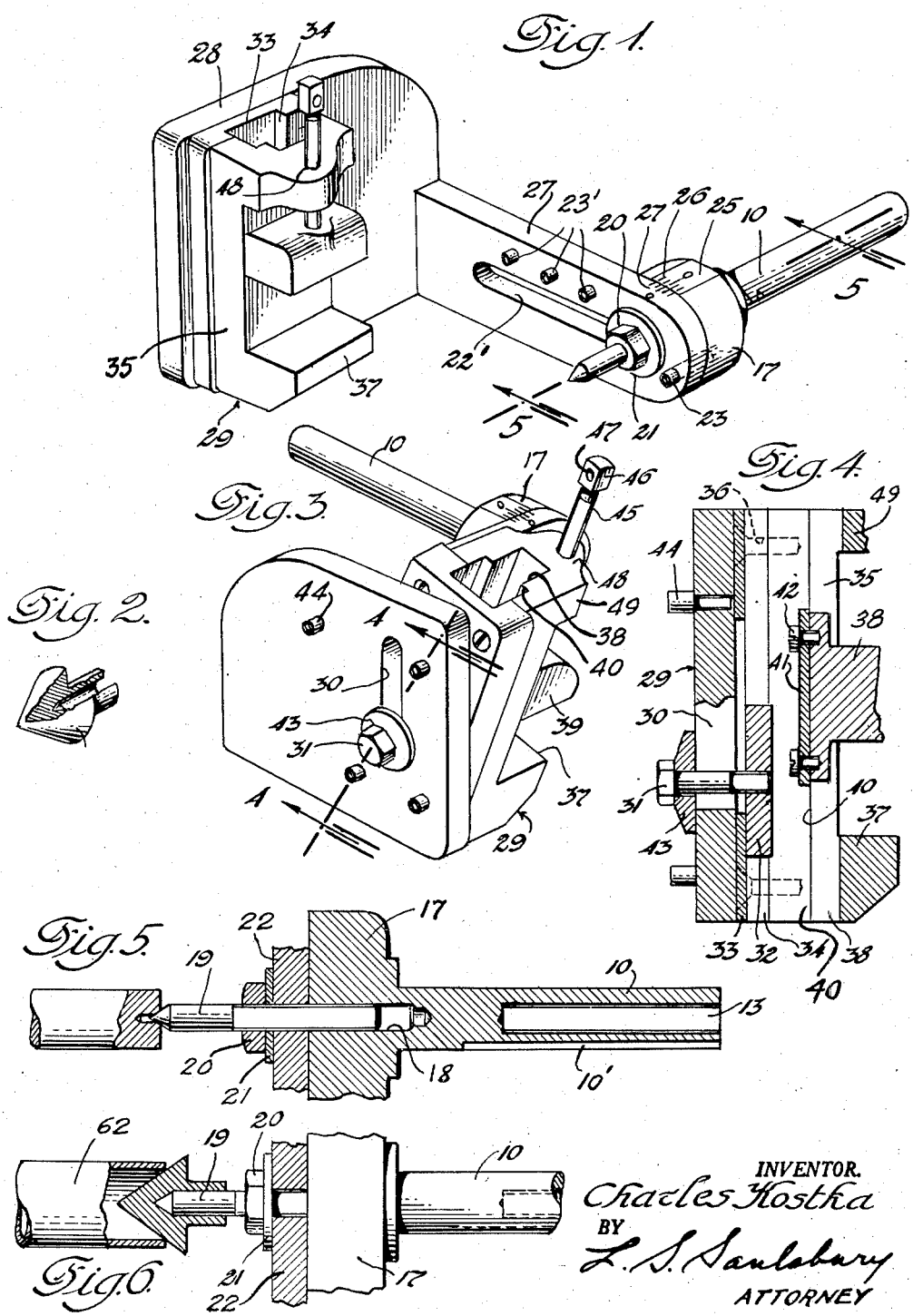
INVENTOR.
Charles Kostka
BY
L. S. Saulsbury
ATTORNEY April 8, 1958 C. KOSTKA 2,829,552
TAIL END STOCK VISE
Filed Nov. 13, 1953 2 Sheets-Sheet 2

INVENTOR.
Charles Kostka
BY
L. S. Saulsbury
ATTORNEY

2,829,552
TAIL END STOCK VISE

Charles Kostka, Bronx, N. Y.

Application November 13, 1953, Serial No. 391,815

1 Claim. (Cl. 82—31)

This invention relates to a tail end stock vise adapted to be retained in a tail end stock and to support various devices with a lathe.

It is an object of the invention to provide a tail end stock vise which can be inserted in and supported from a tail end stock and which has a laterally offset arm that supports a vise on which a cutting tool or a steadying rest can be supported for engagement with a work piece that normally extends between the tail stock and the driving chuck.

It is another object of the invention to provide a tail end stock vise for metal lathes that is laterally adjustable on the tail stock whereby the vise may be adjusted to grip the work piece to firmly support it and prevent it from turning at times when a heavy broaching operation is being performed upon it by the movement of the carriage.

It is another object of the invention to provide a tail end stock vise which can be fixed to the tail end stock for adjustment by the adjusting wheel thereof and which has a centering element carried by it for the supporting of the end of the work piece.

It is another object of the invention to provide a tail end stock vise which has a laterally extending arm that carries the vise and wherein the arm is angularly adjustable upon the supporting attaching shank lying in the tail stock to be able to position the arm and vise to any desired angle relative to the work.

Other objects of the invention are to provide a tail end stock piece vise adapted to be secured to the tail end stock of a lathe which is of simple construction, inexpensive to manufacture, easy to assembly, easy to install upon the lathe, easy to adjust, durable, steady, convenient to use and efficient in operation.

For other objects and a better understanding of the invention, reference may be had to the following detailed description taken in connection with the accompanying drawings, in which:

Figure 1 is a perspective view of the tail end stock vise embodying the features of the present invention;

Fig. 2 is a perspective view of a centering pin adaptor which is secured to the centering element to accommodate hollow work pieces;

Fig. 3 is a rear perspective view of the tail end stock vise looking upon the back of the vise;

Fig. 4 is an enlarged vertical sectional view taken on line 4—4 of Fig. 3;

Fig. 5 is a fragmentary sectional view taken generally on line 5—5 of Fig. 1;

Fig. 6 is a fragmentary view similar to Fig. 5, but with the enlarged centering pin adaptor shown in Fig. 2 connected thereto to support a hollow work piece;

Figure 7:
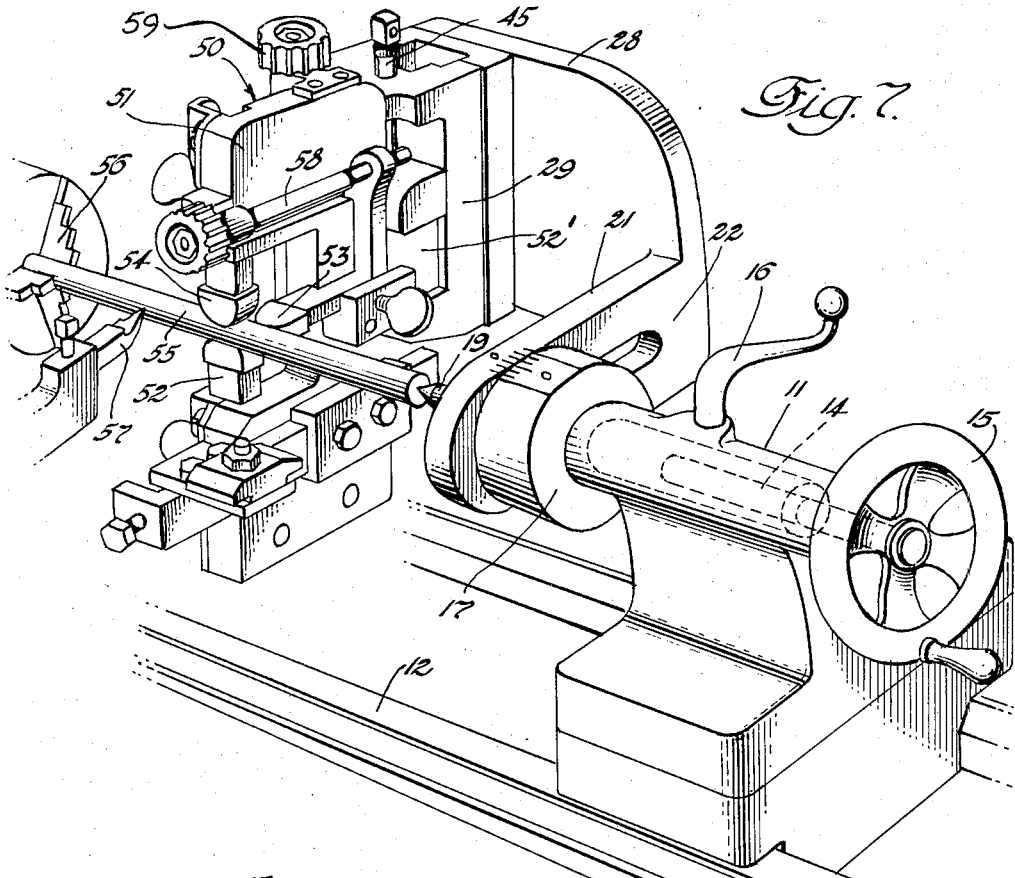
Fig. 7 is a fragmentary perspective view of a lathe including the tail end stock and with the vise fitted in the tail end stock and supporting a steadying rest.

Referring now to the figures, 10 represents a round shank adapted to enter tail end stock 11 on lathe bed 12. This shank has a threaded end opening 13 adapted to receive an adjusting screw 14 operated by a turn wheel 15 on the tail stock. When the adjustment has been effected, the shank is locked in the tail stock by a locking lever 16. The shank 10 has a key way 10' for receiving the projection in the tail end stock whereby the shank will be restrained against turning in the tail end stock. Integrally formed on the shank 10 is an enlarged head formation 17 having a threaded opening 18 into which a centering pin element 19 is threaded. The centering pin element 19 is locked in place when a washer 21 and a lock nut 20 are tightened upon the enlargement 17 to secure vise arm 22 in place. This vise arm 22 has an elongated slot 22' through which the centering pin element 19 extends and can be adjusted laterally of the centering pin element or angled relative to the enlargement 17. In order to further secure the arm 22 against angular displacement upon the enlargement 17, a set screw 23 extends through the arm and is set against the enlargement 17. Other set screws 23' may be used to hold the arm when the arm has been adjusted inwardly to position the vise closer to the work.

The upper edge of the enlargement 17 is flattened as indicated at 25 and has graduations 26 thereon. The arm 21 has corresponding graduations 27 on its upper edge so that any departure or angular adjustment from the zero indication upon the enlargement 17 will be so indicated.

On the end of the vise arm 22 is a back plate formation 28 that extends at right angles to the arm 22. Adjustable upon the back plate 28 is a vise indicated generally at 29. The back plate 28 has a vertically-extending elongated slot 30 through which a clamping bolt 31 extends for engagement with a clamping plate 32 of the vise 29. The clamping plate 32 is adjustable in a groove 34 in a vise plate 33. The plate 33 is secured to a fixed vise jaw body 35 by screws 36. This fixed jaw body 35 has a work-engaging portion 37 and a longitudinally-extending groove 38 in which a movable jaw 39 is adjustable. The groove 38 has parallel longitudinally-extending shoulders 40 with which a plate 41 fixed to the movable jaw 39 by screws 42 engages to hold the movable jaw 39 against outward displacement from the fixed jaw body 35. By removing the vise plate 33 from the fixed jaw body 35 access can be had to the screws 42 of the clamping plate 41 of the movable jaw 39 to either fix the movable jaw within the groove 38 or to remove the same from the fixed jaw body for replacement. The clamping plate 32 is worked through the groove 34 and upon the bolt 31 and its washer 43 being released from the back face of the back plate formation 28, the vise 29 can be angularly adjusted upon the plate 28 to hold the tool or work at the desired angular position. The vise 29 is shown in an angular position in Fig. 3. A plurality of set screws 44 are provided on the back plate to hold the vise in any of its angularly adjusted positions.

The movable jaw 39 is adjusted toward and away from the work-engaging portion 37 of the fixed jaw 35 by an adjusting screw 45 having a head 46 with an opening 47 through which a handle may be extended to effect the tight adjustment of the screw 45. This adjusting screw 45 is adjustable through a threaded opening 48 in an integral projection 49 extending outwardly from the fixed jaw 35 at the opposite end thereof from the work-engaging portion 37.

This vise 29 may serve to support a steadying rest indicated generally at 50 in Fig. 7. Such a steadying rest is shown and described in detail in my co-pending application, Serial No. 392,137, filed November 13, 1953. Such a steadying rest comprises generally a vertically extending plate 51 having an attaching projection 52' on the rear edge thereof for connection with the vise jaws 37 and 39 of the vise 29. The vise 29 extends vertically when supporting this steadying rest so that steadying fingers 52, 53 and 54 will lie on three sides of a cylindrical work piece 55 carried in a chuck 56 of the lathe 12, centered on its tail end by centering element 19 and being worked upon by a cutting bit 57. Adjusting screws 58 are provided on the rest to adjust the work-engaging fingers .It will be seen that the steadying rest is held rigidly in place in proper relationship to the work piece and that the work piece is rigidly retained by the tail end stock which is provided with the centering element 19 for receiving the work piece. It should now be seen that the arm 21 can be adjusted to any location upon the shank 10 so as to properly locate the vise at its proper location relative the work piece.

Figure 8:
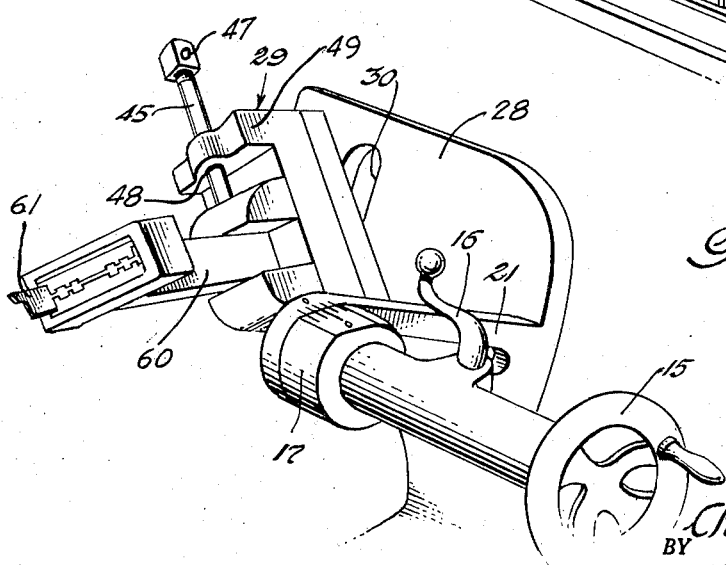
Fig. 8 is a fragmentary perspective view of the tail end stock vise with a tool element carried and supported thereon.

In Fig. 8 there is shown the vise 29 disposed at an angle relative to the back plate 28 and being used to support an all purpose cutting tool holder 60 having a cutting bit 61.

If the work piece is a tubular member 62, as shown in Fig. 6, an adaptor 63 having a wide tapered formation is slipped upon the centering element 19 to receive the open end of tubular work piece 62.

While only two uses for the device have been shown, it will be apparent that the vise can retain and support other tool elements adapted for use upon a lathe, such as a shaper as disclosed in my pending application, Serial No. 313,917, filed October 9, 1952, now Patent No. 2,741,953, granted April 17, 1956. When the shaper is used, the work is fixed in the vise and the shaper is fixed in the tool post on the carriage. The vise will hold the work firmly while the shaper is automatically fed along the work by the carriage.

While various changes may be made in the detail construction, it shall be understood that such changes shall be within the spirit and scope of the present invention as defined by the appended claim.

What is claimed is:

A tail end stock vise for a lathe comprising a shank adapted to enter the opening in a lathe tail end stock, said shank having a central threaded opening adapted to receive the adjusting screw of lathe tail end stock to be axially adjusted thereby and a longitudinally-extending key way adapted to receive a key on the end stock to prevent rotation of said shank while being axially adjusted, a head formation provided on said shank and having a threaded opening extending into the axial center thereof, a centering pin element having a threaded portion threaded into the threaded opening in the head formation, a laterally-extending vise supporting arm mounted for adjustment on the centering pin element, a vise carried by said vise arm laterally offset from the centering pin element, and lock nut means on said threaded portion of the centering pin for retaining said vise arm in its adjusted position on the head formation.

References Cited in the file of this patent

UNITED STATES PATENTS

| | | |
|---|---|---|
| 319,071 | Colesworthy | June 2, 1885 |
| 435,416 | Francis | Sept. 2, 1890 |
| 940,301 | Carlborg | Nov. 16, 1909 |
| 1,521,001 | Bowman | Dec. 30, 1924 |
| 1,663,192 | Compton | Mar. 20, 1928 |
| 1,931,730 | Klay | Oct. 24, 1933 |
| 2,203,162 | Lee | June 4, 1940 |
| 2,536,175 | Hansen | Jan. 2, 1951 |
| 2,609,592 | Shumaker | Sept. 9, 1952 |
| 2,724,302 | Poorman | Nov. 22, 1955 |

FOREIGN PATENTS

| | | |
|---|---|---|
| 103,203 | Great Britain | Jan. 18, 1917 |
| 562,736 | Great Britain | July 13, 1944 |